(12) United States Patent
Gokay et al.

(10) Patent No.: US 8,055,696 B2
(45) Date of Patent: Nov. 8, 2011

(54) MODULAR MULTIPLICATION METHOD, MODULAR MULTIPLIER AND CRYPTOSYSTEM HAVING THE SAME

(75) Inventors: Saldamli Gokay, Suwon-si (KR); Yoo-Jin Baek, Seongnam-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 1033 days.

(21) Appl. No.: 11/980,360

(22) Filed: Oct. 31, 2007

(65) Prior Publication Data

US 2009/0100120 A1    Apr. 16, 2009

(30) Foreign Application Priority Data

Oct. 11, 2007    (KR) .................. 10-2007-0102588

(51) Int. Cl.
*G06F 7/38*    (2006.01)
(52) U.S. Cl. .................................................. 708/491
(58) Field of Classification Search ........... 708/491–492
See application file for complete search history.

(56) References Cited

U.S. PATENT DOCUMENTS

| 4,346,451 A * | 8/1982 | Katayama ............... 708/491 |
| 5,572,454 A | 11/1996 | Lee et al. |
| 2003/0135530 A1 | 7/2003 | Parthasarathy et al. |

FOREIGN PATENT DOCUMENTS

| JP | 08-263315 | 10/1996 |
| KR | 1995-0015177 | 12/1995 |

OTHER PUBLICATIONS

"A New Modular Reduction Algorithm for Fast Exponentiation", Jae-cheol Ha, Chang-soon Lee, Sang-jae Moon; Korea Institute of Information Security & Cryptology General Studies Conference Collection of Papers vol. 6. No. 1, Nov. 30, 1996.

"A New Modular Reduction Algorithm for Fast Exponentiation", Jae-cheol Ha, Chang-soon Lee, Sang-jae Moon; Korea Institute of Information Security & Cryptology General Studies Conference Collection of Papers vol. 6. No. 1.

SPA-Resistant Unsigned Left-to —Right Recoding Method, Sung-kyoung Kim, Dong-Guk Han, Ho Won Kim, Kyo Il Chung, Jongin Lim, Graduate School of Information Management and Security, Korea University, Electronics and Telecommunications Research Institute, Feb. 2007.

* cited by examiner

*Primary Examiner* — Tan V Mai
(74) *Attorney, Agent, or Firm* — Harness, Dickey & Pierce, P.L.C.

(57) ABSTRACT

Provided are a modular multiplication method with an improved arithmetic operation, a modular multiplier and a cryptograph calculating system having the modular multiplier. The modular multiplication method comprises performing a first arithmetic operation including a first multiplication on a first bit string of a multiplicand and a first bit string of a multiplier and a first reduction for eliminating partial bits of the first multiplication result, performing a second arithmetic operation including a second multiplication on a second bit string of the multiplicand and a second bit string of the multiplier and a second reduction for eliminating partial bits of the second multiplication result, and calculating a modular multiplication result using the result of the first arithmetic operation and the result of the second arithmetic result. The first arithmetic operation and the second arithmetic operation are independently performed.

23 Claims, 5 Drawing Sheets

MODULAR MULTIPLICATION METHOD, MODULAR MULTIPLIER AND CRYPTOSYSTEM HAVING THE SAME

PRIORITY STATEMENT

This application claims the benefit of Korean Patent Application No. 10-2007-0102588, filed on Oct. 11, 2007, in the Korean Intellectual Property Office, the disclosure of which is incorporated herein in its entirety by reference.

BACKGROUND

1. Field

Example embodiments relate to a modular multiplication method and, for example, to a modular multiplication method, a modular multiplier and a cryptograph calculating system having the same for improving a multiplication method and a reduction method to increase a modular multiplication processing speed.

2. Description of the Related Art

Encryption methods may be generally divided into an encryption method using a secret key (or symmetric key) and an encryption method using a public key (or asymmetric key). An encryption method using a secret key is a technique in which two communication devices encrypt and transmit data or decrypt received data using the same secret key. Because the encryption method using a secret key requires the two communication devices to share the same secret key, a safe key transmitting/receiving channel only for the two communication devices is needed.

An encryption method using a public key is a technique in which a communication device encrypts data using a public key of a counterpart's communication device, transmits the encrypted data to the counterpart's communication device and decrypts received data using its secret key that is not opened. Accordingly, it is easy to manage a key in the encryption using a public key because each communication device manages only its own secret key.

Typical public key algorithms include the RSA (Ron Rivest, Adi Shamir, Len Adleman) algorithm, ECC (elliptic curve cryptography) algorithm and DH (Diffie-Hellman) algorithm. A public key encryption system employing the RSA algorithm is most widely used and uses the degree of difficulty of factorization. This RSA encryption system and other encryption systems may be used for electronic signing as well as encryption.

A fundamental arithmetic operation applied to encryption systems including the RSA encryption system is modular exponentiation. Modular exponentiation requires iterative modular multiplication. Modular multiplication generally uses a method of continuously adding a multiplicand based on bits of a multiplier and a method of continuously subtracting a modulus until the result of a multiplication performed on the multiplier and the multiplicand becomes smaller than the modulus for reduction.

For example, to encrypt a plain text M, an RSA encryption system calculates $M^e$ using a public key (e,m) (e is an encryption index) composed of two positive integers, divides the calculation result by n and forms a cipher text C using the remainder of the division. In the case of decryption, when the cipher text C is multiplied by d using a secret key (d,n) (d is a decryption index) and the multiplication result is divided by n, the remainder of the division becomes the plain text M. The encryption and decryption are represented as follows $$C=M^e \bmod m, M=C^d \bmod n \qquad \text{[Equation 1]}$$

Here, e denotes the encryption index, d denotes the decryption index and n represents a modulus.

As described above, most public key encryption systems are based on modular multiplication or modular exponentiation based on modular multiplication, and thus how efficiently a modular multiplication algorithm is constructed may represent an absolute index of system performance. In order to efficiently construct a modular multiplication algorithm, system performance should be higher, design complexity should be lower, and an area occupied by a circuit should be smaller. However, when one of these factors is improved, other factors may deteriorate. For example, a high-performance modular multiplier may have a large circuit area because it uses a parallel circuit configuration. Accordingly, modular multipliers may be constructed on the basis of trade-off strategy of the aforementioned factors.

In modular multiplying arithmetic, the number of multiplications determines the arithmetic speed, and thus a time required for the arithmetic increases as the number of multiplications increases. Further, the time required for the arithmetic increases according to sequential arithmetic characteristic of a reducing arithmetic. Moreover, the size of hardware for implementing a modular arithmetic device may be affected by interleaving of multiplication and reduction of modular arithmetic because an arithmetic block for multiplication must be separated from an arithmetic block for reduction in the case of a lack of interleaving of multiplication and reduction.

That is, for efficient modular multiplying arithmetic, a scheme of reducing the number of multiplications which the modular multiplier needs to operate or efficient multiplication and reduction in consideration of interleaving of multiplication and reduction is useful. In the case of the widely known Karatsuba algorithm, when multiplying arithmetic is performed on two numbers each having multiple bits, the number of multiplications is reduced to improve a modular multiplication processing speed.

However, conventional modular multipliers are constructed in such a manner that a multiplication block and a reduction block are separated from each other because of a lack of interleaving of multiplication and reduction, and thus hardware configuration is inefficient. Furthermore, in interleaving based modular multiplication arithmetic methods, sequential left-to-right or sequential right-to-left is applied to reduction so as to decrease a modular arithmetic processing speed.

SUMMARY

Example embodiments provide a modular multiplying arithmetic method, a modular multiplier and a cryptograph calculating system having the same for reducing the number of multiplications so as to more efficiently perform modular multiplication using parallel multiplication and reduction methods.

According to example embodiments, there is provided a modular multiplication method comprising: performing a first arithmetic operation including a first multiplication on a first bit string of a multiplicand and a first bit string of a multiplier and a first reduction for eliminating partial bits of the first multiplication result; performing a second arithmetic operation including a second multiplication on a second bit string of the multiplicand and a second bit string of the multiplier and a second reduction for eliminating partial bits of the second multiplication result; and calculating a modular multiplication result using the result of the first arithmetic operation and the result of the second arithmetic result, wherein the first arithmetic operation and the second arithmetic operation are independently performed.

In example embodiments, the first arithmetic operation and the second arithmetic operation may be simultaneously performed.

In example embodiments, the first reduction may comprise adding a first multiple of predetermined or defined bits of a modulus to the first multiplication result, and the second reduction may comprise adding a second multiple of other predetermined or defined bits of the modulus to the second multiplication result.

In example embodiments, the multiplicand may include the first bit string corresponding to lower n bits and the second bit string corresponding to upper n bits, and the multiplier may include the first bit string corresponding to lower n bits and the second bit string corresponding to upper n bits.

In example embodiments, the first reduction may add a first multiple of a first bit string of the modulus to the first multiplication result in order to eliminate predetermined or defined lower bits of the first multiplication result, and the second reduction may add a second multiple of a second bit string of the modulus to the second multiplication result in order to eliminate predetermined or defined upper bits of the second multiplication result.

In example embodiments, the modulus may include the first bit string corresponding to lower n bits and the second bit string corresponding to upper n bits.

In example embodiments, the first arithmetic operation may eliminate lower n bits from the first multiplication result having 2n bits and provide upper n bits of the first multiplication result as a first arithmetic operation result, and the second arithmetic operation may eliminate upper n bits from the second multiplication result having 2n bits and provide lower n bits of the second multiplication result as a second arithmetic operation result.

In example embodiments, the modular multiplication operation may calculate $a*b*R^{-1} \bmod m$ ($R=2^n$, m is a modulus) to obtain the modular multiplication result and calculate $t'2*R+t'0$ ($t'0$ corresponds to the first arithmetic operation result having n bits and $t'2$ corresponds to the second arithmetic operation result having n bits) to obtain an interim value.

In example embodiments, the modular multiplication operation may add a first value obtained by multiplying the first bit string of the multiplicand by the second bit string of the multiplier, a second value obtained by multiplying the second bit string of the multiplicand by the first bit string of the multiplier, a third value corresponding to a second multiple of the first bit string of the modulus and a fourth value corresponding to a first multiple of the second bit string of the modulus to the interim value.

In example embodiments, the modular multiplication operation may perform a multiplication for calculating $(a0+a1)*(b0+b1)$ and a multiplication for calculating $(q'0+q1)*(m0+m1)$ (a0 represents the first bit string of the multiplicand, a1 represents the second bit string of the multiplicand, b0 denotes the first bit string of the multiplier, b1 denotes the second bit string of the multiplier, q'0 represents the first multiple, q1 represents the second multiple, m0 denotes the first bit string of the modulus, and m1 denotes the second bit string of the modulus), and calculate $a*b*R^{-1} \bmod m = (a0+a1)(b0+b1)+(q'0+q1)(m0+m1)+t'0-t'0*R-t'2+t'2*R$ to obtain the modular multiplication result.

According to example embodiments, there is provided a modular multiplication method comprising: performing a multiplication on a multiplicand and a multiplier; performing a first reduction for eliminating lower bits of the multiplication result and a second reduction for eliminating upper bits of the multiplication result; and obtaining a modular multiplication result using the first reduction result and the second reduction result, wherein the first reduction and the second reduction are independently performed.

According to example embodiments, there is provided a modular multiplier comprising: a first arithmetic block performing a first multiplication on a first bit string of a multiplicand and a first bit string of a multiplier and carrying out a first reduction for eliminating partial bits of the first multiplication result; a second arithmetic block performing a second multiplication on a second bit string of the multiplicand and a second bit string of the multiplier and carrying out a second reduction for eliminating partial bits of the second multiplication result; and a third arithmetic block obtaining a modular multiplication result using outputs of the first arithmetic block and the second arithmetic block.

According to example embodiments, there is provided a cryptosystem including a modular multiplier, the modular multiplier comprising: a first arithmetic block performing a first multiplication on a first bit string of a multiplicand and a first bit string of a multiplier and carrying out a first reduction for eliminating partial bits of the first multiplication result; a second arithmetic block performing a second multiplication on a second bit string of the multiplicand and a second bit string of the multiplier and carrying out a second reduction for eliminating partial bits of the second multiplication result; and a third arithmetic block obtaining a modular multiplication result using outputs of the first arithmetic block and the second arithmetic block.

According to example embodiments, the number of multiplications required in a modular multiplying arithmetic may be reduced. Furthermore, a modular multiplication processing speed may be improved by using a parallel reduction method.

BRIEF DESCRIPTION OF THE DRAWINGS

Example embodiments will become more apparent by describing them in detail with reference to the attached drawings in which.

DETAILED DESCRIPTION OF EXAMPLE EMBODIMENTS

Figure 1:
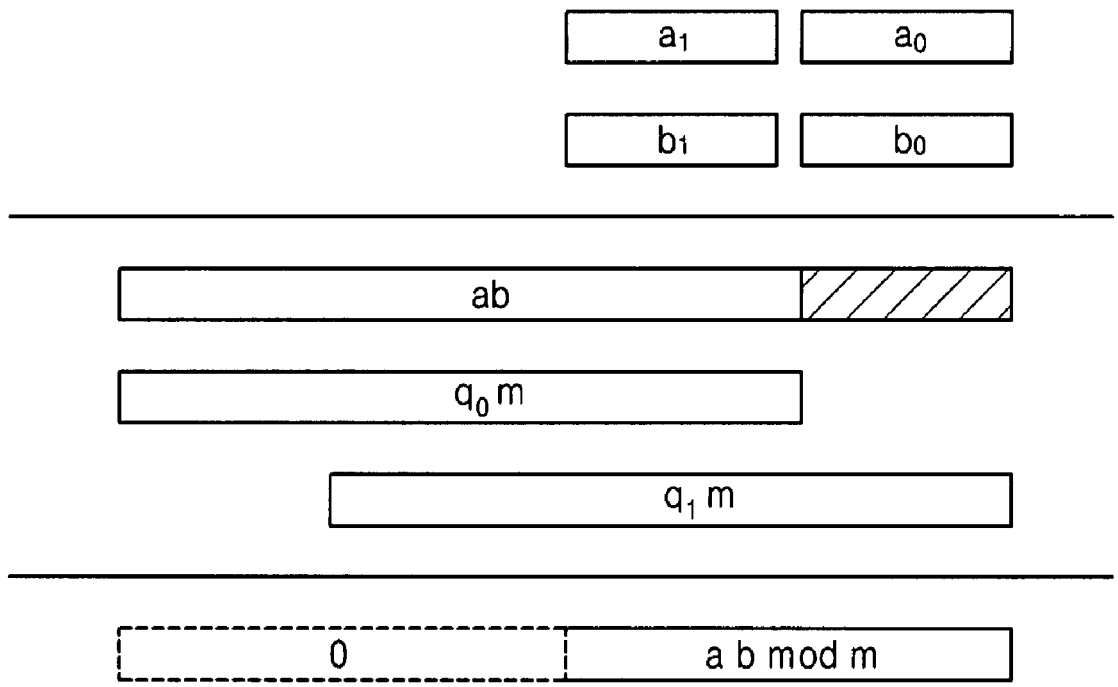
FIG. 1 illustrates a left-to-right reduction that may be applied to example embodiments.

Example embodiments of the present invention will be more clearly understood from the detailed description taken in conjunction with the accompanying drawings.

Various example embodiments of the present invention will now be described more fully with reference to the accompanying drawings in which some example embodiments of the invention are shown. In the drawings, the thicknesses of layers and regions may be exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Also, the use of the words "compound," "compounds," or "compound(s)," refer to either a single compound or to a plurality of compounds. These words are used to denote one or more compounds but may also just indicate a single compound.

Now, in order to more specifically describe example embodiments of the present invention, various embodiments of the present invention will be described in detail with reference to the attached drawings. However, the present invention is not limited to the example embodiments, but may be embodied in various forms. In the figures, if a layer is formed on another layer or a substrate, it means that the layer is directly formed on another layer or a substrate, or that a third layer is interposed therebetween. In the following description, the same reference numerals denote the same elements.

Although the example embodiments of the present invention have been disclosed for illustrative purposes, those skilled in the art will appreciate that various modifications, additions and substitutions are possible, without departing from the scope and spirit of the invention as disclosed in the accompanying claims.

FIG. 1 illustrates a left-to-right reduction that may be applied to example embodiments. Referring to FIG. 1, a left-to-right reduction for modular arithmetic corresponding to a*b mod m is performed. Left-to-right arithmetic can be applied to the Barrett arithmetic method that is not based on interleaving and the Blakley arithmetic method based on interleaving of a shift-add operation of a multiplication and a shift-subtract operation of a division. FIG. 1 illustrates that a reduction is carried out on a multiplication result on the basis of the left-to-right arithmetic.

For example, multiplication is performed on a multiplicand a including at least one upper bit a1 and at least one lower bit a0 and a multiplier b including at least one upper bit b1 and at least one lower bit b0. A modulus m is multiplied by a predetermined or defined integer q0, and the multiplication result m*q0 is shifted to a left direction, and the shifted result is added to or subtracted from the multiplication result a*b. When the addition or subtraction is performed, the addition or subtraction is not carried out on predetermined or defined lower bits of the multiplication result a*b, as indicated by slant lines in FIG. 1.

Predetermined or defined upper bits of the multiplication result a*b become "0" according to the addition or subtraction. Subsequently, a value obtained by multiplying the modulus m by a predetermined or defined integer q1 is added to the addition or subtraction result or subtracted from the addition or subtraction result. The shifting operation and the addition or subtraction are repeated to calculate a*b mod m.

Figure 2:
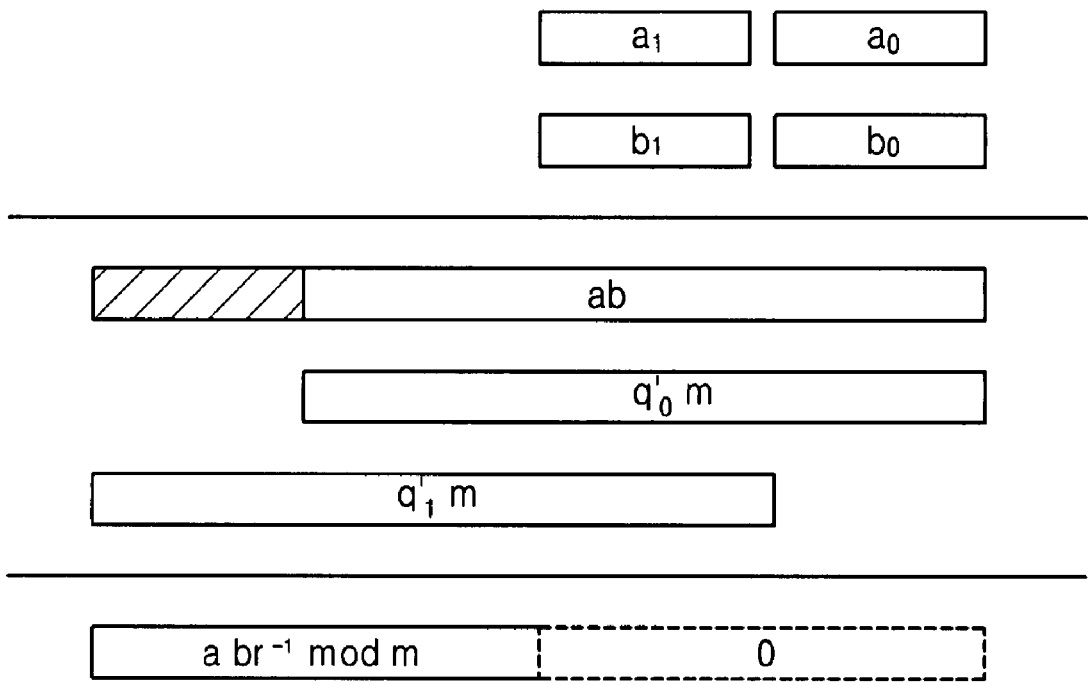
FIG. 2 illustrates a right-to-left reduction that may be applied to example embodiments.

FIG. 2 illustrates the Montgomery algorithm as an example of a right-to-left modular multiplication that may be applied to example embodiments. A modular arithmetic device based on the Montgomery algorithm receives an n-bit multiplicand a, an n-bit multiplier b and a modulus m and calculates $a*b*R^{-1}$ mod m. The multiplicand a is composed of at least one upper bit a1 and at least one lower bit a0 and the multiplier b is composed of at least one upper bit b1 and at least one lower bit b0. In example embodiments, R is defined as $2^n$.

According to the Montgomery algorithm, arithmetic on predetermined or defined bits of the multiplicand and predetermined or defined bits of the multiplier is performed. For example, arithmetic is carried out on predetermined or defined lower bits of the multiplicand and the multiplier, and a predetermined or defined multiple of the modulus m is defined for the least significant bit (LSB) of the arithmetic result in a reduction process. The result of the arithmetic performed on the lower bits a0 and b0 is added to the predetermined or defined multiple of the modulus m to remove the LSB of the arithmetic result (that is, make the LSB "0"). Then, arithmetic is performed on upper bits of the multiplicand and the multiplier based on a left-shift operation. A predetermined or defined multiple of the modulus m is defined for the arithmetic result of the upper bits and a reduction is carried out to remove the second LSB. The aforementioned process is repeated to make lower n bits of the final arithmetic result "0" and obtain a*b*R^−1 as a value of upper n bits.

For example, multiplication is performed on a multiplicand a composed of at least one upper bit a1 and at least one lower bit a0 and a multiplier b composed of at least one upper bit b1 and at least one lower bit b0. In order to sequentially eliminate lower bits of the multiplication result a*b in a reduction process, a value obtained by multiplying the modulus m by a predetermined or defined integer q0' is added to the multiplication result a*b. While the addition is carried out, the addition is not performed on predetermined or defined upper bits of the multiplication result a*b, indicated by slant lines. Subsequently, the multiplication and the reduction are repeated based on a left-shift operation such that lower bits of the multiplication result a*b become "0". The upper bits calculated by the reduction have a value a*b*R^−1 mod m.

Figure 3:
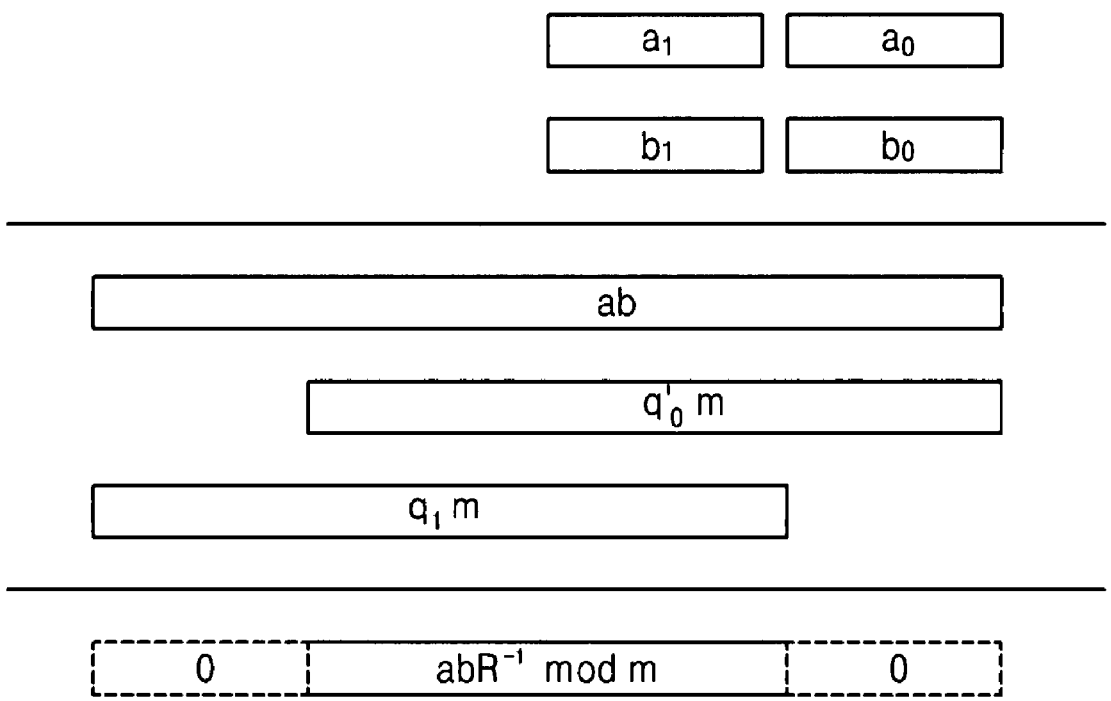
FIG. 3 illustrates a modular multiplication method according to an embodiment of example embodiments.

FIG. 3 illustrates a modular multiplication method according to example embodiments. The modular multiplication method according to example embodiments may employ a hybrid reduction corresponding to a combination of a left-to-right reduction and a right-to-left reduction. In example embodiments, the left-to-right reduction and the right-to-left reduction may be independently performed.

As described above with reference to FIG. 1, in the left-to-right reduction, arithmetic is not actually performed on lower bits of the multiplication result a*b (indicated by slant lines) when a multiple of the modulus m, q0*m, is added to or subtracted from upper bits of the multiplication result a*b. Furthermore, in the right-to-left reduction illustrated in FIG. 2, arithmetic is not actually performed on upper bits of the multiplication result a*b (indicated by slant lines) when a multiple of the modulus m, q'0*m, is added to or subtracted from lower bits of the multiplication result a*b.

That is, the arithmetic performed on lower bits depends on the arithmetic result for upper bits in the left-to-right reduction, and the arithmetic carried out on upper bits depends on the arithmetic result for lower bits in the right-to-left reduction. However, in the modular arithmetic method according to example embodiments, a reduction performed on upper bits of the arithmetic result a*b and a reduction carried out on lower bits of the arithmetic result a*b are independently carried out. In example embodiments, the left-to-right reduction and the right-to-left reduction are simultaneously performed.

FIG. 3 illustrates that the multiplicand a includes at least one upper bit string a1 and at least one lower bit string a0 and the multiplier b includes at least one upper bit string b1 and at least one lower bit string b0. For example, the multiplicand a may have 2n bits and the upper bit string a1 and the lower bit string a0 may each have n bits respectively. The multiplier b may have 2n bits and the upper bit string b1 and the lower bit string b0 may each have n bits. The modulus m may have 2n bits. The modular arithmetic method according to example embodiments may perform an algorithm for calculating a*b*R^−1 mod m. In example embodiments, R is 2^n.

Referring to FIG. 3, a predetermined or defined multiple of the modulus m, q'0*m, is added to or subtracted from the result of a multiplication performed on the multiplicand a and the multiplier b in order to sequentially eliminate lower bits of the multiplication result a*b. Simultaneously, a predetermined or defined multiple of the modulus m, q1*m, is added to or subtracted from the multiplication result a*b in order to sequentially eliminate upper bits of the multiplication result a*b. Accordingly, predetermined or defined upper bits and predetermined or defined lower bits of the multiplication result a*b are eliminated. That is, the predetermined or defined upper bits and predetermined or defined lower bits of the multiplication result a*b become "0". When the value of middle bits other than the eliminated bits is smaller than the modulus m, the value corresponds to the result of a*b*R^−1 mod m.

Figure 4:
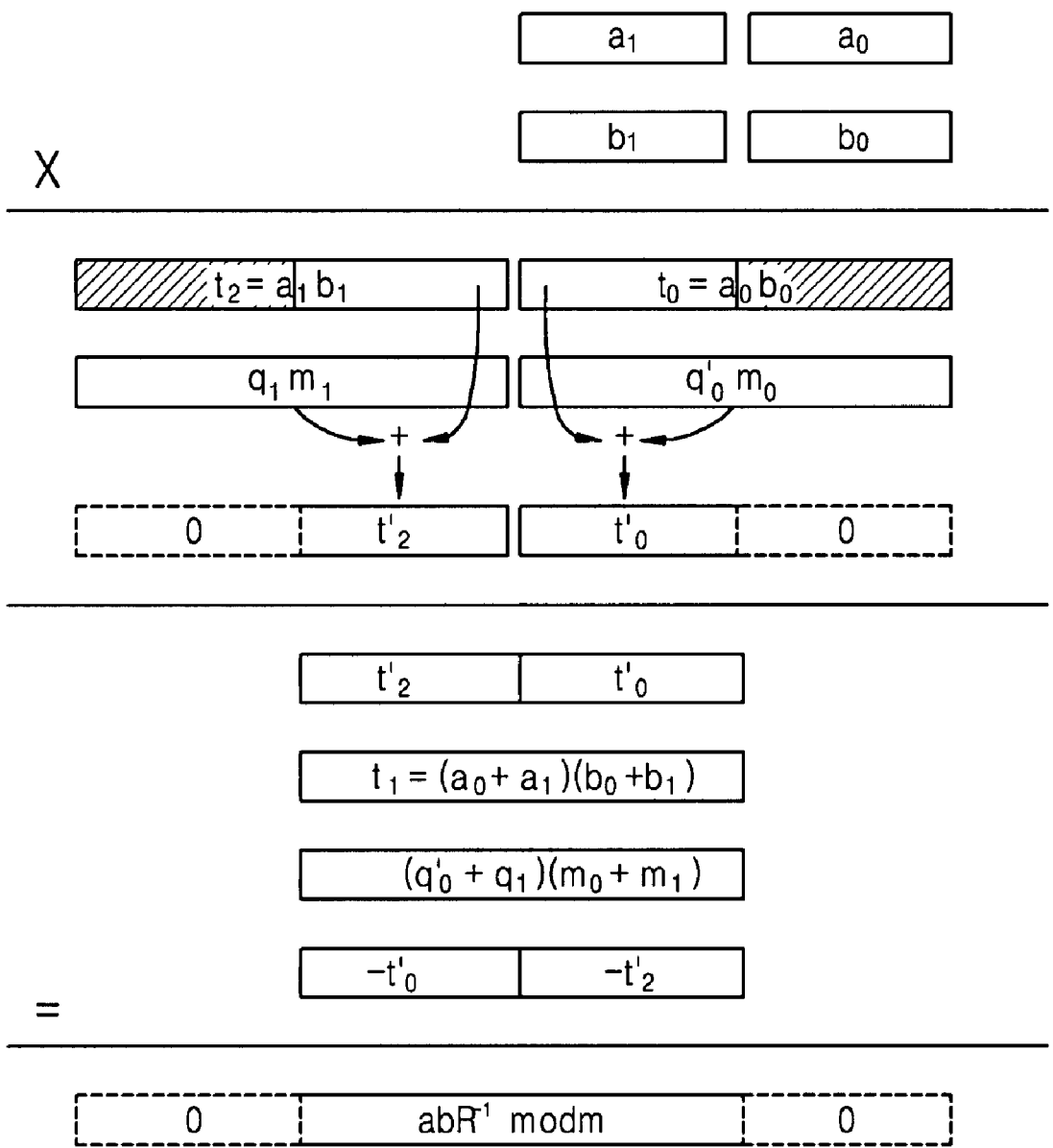
FIG. 4 illustrates the modular multiplication method illustrated in FIG. 3 in more detail.

FIG. 4 illustrates the modular multiplication method illustrated in FIG. 3 in more detail. Referring to FIG. 4, a first operation of the modular multiplication method may include a first arithmetic process performed on a bit string (for example, the lower bit string a0) of the multiplicand a and a bit string (for example, the lower bit string b0) of the multiplier b, and a second arithmetic process carried out on another bit string (for example, the upper bit string a1) of the multiplicand a and another bit string (for example, the upper bit string b1) of the multiplier b. The first arithmetic process and the second arithmetic process may be independently performed. In example embodiments, the first arithmetic process and the second arithmetic process are simultaneously carried out.

In the first arithmetic process, a multiplication (t0=a0*b0) is performed on the lower bit string a0 of the multiplicand a and the lower bit string b0 of the multiplier b. The first arithmetic process may include a first reduction for eliminating predetermined or defined lower bits of the multiplication result t0=a0*b0 (that is, for making the predetermined or defined lower bits "0"). In the first reduction, a lower bit string m0 of the modulus m is multiplied by a predetermined or defined integer q'0 (q'0*m0) and the multiplication result q0*m0 is added to the multiplication result t0=a0*b0. The integer q'0 may be appropriately selected in order to eliminate lower bits of the multiplication result t0=a0*b0. The first arithmetic result may be obtained according to the addition result. According to the first arithmetic result, predetermined or defined bits have a value "0" and predetermined or defined upper bits have a value t'0. In example embodiments, the lower bit string m0 has n bits for the 2n-bit modulus m. In the first arithmetic result, lower n bits have a value "0" and upper n bits have a value t'0.

In the second arithmetic process, a multiplication (t2=a1*b1) is performed on the upper bit string a1 of the multiplicand a and the upper bit string b1 of the multiplier b. The second arithmetic process may include a second reduction for eliminating predetermined or defined upper bits of the multiplication result t2=a1*b1. In the second reduction, an upper bit string m1 of the modulus m is multiplied by a predetermined or defined integer q1 (q1*m1) and the multiplication result q1*m1 is added to the multiplication result t2=a1*b1. The integer q1 may be appropriately selected in order to eliminate the lower bits of the multiplication result t2=a1*b1. The second arithmetic result is obtained according to the addition result. In example embodiments, the integer q1 may have a negative value in order to eliminate upper bits of the multiplication result t2=a1*b1. According to the second arithmetic result, predetermined or defined upper bits (n bits) have a value "0" and predetermined or defined lower bits (n bits) have a value t'2. The upper bit string m1 has n bits for the 2n-bit modulus m.

As described above, the first arithmetic process and the second arithmetic process may be independently performed. Furthermore, the first reduction and the second reduction may also be independently carried out, and thus the predetermined or defined integer q'0 corresponding the first reduction is independent of the predetermined or defined integer q1 corresponding the second reduction. Accordingly, the left-to-right reduction and the right-to-left reduction may be performed independently and simultaneously.

After the first operation of the modular multiplication method, a second operation of calculating a*b*R^−1 mod m is performed. Because q'0*m0 is added to the multiplication result t0=a0*b0 in the first operation, the result of a multiplication performed on the upper bit string m1 of the modulus m and the integer q'0 should be further added in the second operation. Also, because q1*m1 is added to the multiplication result t2=a1*b1 in the first operation, the result of a multiplication carried out on the lower bit string m0 of the modulus m and the integer q1 should be further added in the second operation.

Further, because only the multiplication of the lower bit string a0 of the multiplicand and the lower bit string b0 of the multiplier b and the multiplication of the upper bit string a1 of the multiplicand a and the upper bit string b1 of the multiplier b are performed in the first operation, the result of a multiplication of the upper bit string a1 of the multiplicand and the lower bit string b0 of the multiplier b and the result of a multiplication of the lower bit string a0 of the multiplicand a and the upper bit string b1 of the multiplier b should be added in the second operation.

That is, arithmetic corresponding to Equation 2 is performed to calculate $a*b*R^{-1}$ mod m.

$$a*b*R^{\wedge}-1 \bmod m = t'2*R+t'0+(a0+a1)(b0+b1)-a0*b0-a1*b1+q'0*m1+q1*m0 \quad \text{[Equation 2]}$$

Here, $R=2^n$.
As illustrated in FIG. 4, Equation 3 is satisfied.

$$a0*b0+q'0*m0=t0+q'0*m0=t'0*R$$

$$a1*b1+q*m1=t2+q*m=t'2. \quad \text{[Equation 3]}$$

Equation 2 and Equation 3 are arranged to obtain Equation 4.

$$\begin{aligned} a*b*R^{\wedge} - 1 \bmod m &= (a0+a1)(b0+b1) - \\ &\quad (t'0*R - q'0*m0) - \\ &\quad (t'2 - q1*m1) + t'0 + \\ &\quad t'2*R + q'0*m1 + q1*m0 \\ &= (a0+a1)(b0+b1) + \\ &\quad (q'0+q1)(m0+m1) + \\ &\quad t'0 - t'0*R - t'2 + t'2*R \end{aligned} \quad \text{[Equation 4]}$$

As illustrated in FIG. 4, the modular multiplication method according to example embodiments may perform the arithmetic process represented by Equation 4 in the second operation. That is, an interim value t'2*R+t'0 composed of upper bits corresponding to t'2 and lower bits corresponding to t'0 is calculated in the first operation, and (a0+a1)*(b0+b1) and (q'0+q1)(m0+m1) are added to the interim value t'2*R+t'0. Furthermore, a value t'0*R+t'2 is subtracted from the interim value.

As described above, the modular multiplication method according to example embodiments may calculate the interim value t'2*R+t'0 according to the first operation in which the left-to-right reduction and the right-to-left reduction are performed in parallel. Furthermore, when the modular multiplication result is obtained using the calculated interim value, a method similar to Karatsuba arithmetic may be effectively used as illustrated in FIG. 4. Accordingly, the number of multiplications required for the second operation can be reduced. For example, the arithmetic illustrated in FIG. 4 requires only two multiplications ((a0+a1)(b0+b1), (q'0+q1)(m0+m1)) while the arithmetic illustrated in FIG. 2 requires three multiplications ((a0+a1)(b0+b1), q'0*m1, q1*m0).

An example of the above-described modular multiplication will be explained with reference to the following table.

Although arithmetic is performed in the binary system in practical hardware, modular multiplication in the decimal system is represented in Table 1 for convenience of explanation.

TABLE 1

| A | 12 | 34 | |
|---|---|---|---|
| B | 56 | 78 | |
| 12*50 → | 0600 | 0272 | ← 34*08 |
| 39*10 → | 390 | 648 | ← 81*08 |
| (600 − 390) → | 0210 | 0920 | ← (272 + 648) |
| 12*06 → | 0072 | 2380 | ← 34*70 |
| 39*07 → | 273 | 0 | ← 81*00 |
| (210 + 72 − 273) → | 0009 | 3300 | ← (920 + 2380 + 0) |
| | 0933 | | ← t'2*R + t'0 |
| | (34 + 12)(78 + 56) | | ← (a0 + a1)(b0 + b1) |
| | (08 + (−17))(81 + 39) | | ← (q'0 + q1)(m0 + m1) |
| | −3309 | | ← −(t'0*R + t'2) |
| | 2708 | | |
| | $a*b*R^{\wedge}-1 \bmod m$ | | |

Table 1 represents modular multiplication using decimal numbers. In Table 1, a=1234, b=5678, m=3981, and R=10^2. In addition, a0=34, a1=12, b0=78, b1=56, m0=81 and m1=39.

To eliminate predetermined or defined lower bits from the result of multiplication of the lower bit string a0 (=34) of the multiplicand a and the lower bit string b0 (=78) of the multiplier b, an integer multiple of the lower bit string m0 (=81) is added to the multiplication result (34*78). In Table 1, 81*08 and 81*00 are added to the multiplication result, and thus two lower bits are eliminated from the multiplication result. In this case, t'0 is 33 and q'0 is 08.

In order to eliminate predetermined or defined upper bits from the result of multiplication of the upper bit string a1 (=12) of the multiplicand and the upper bit string b1 (=56) of the multiplier, an integer multiple of the upper bit string m0 (=−07) is added to the multiplication result. In table 1, 39*(−10) and 39*(07) are added to the multiplication result, and thus two upper bits are eliminated. In this case, t'2 is 09 and q1 is −17.

After the first operation of the modular multiplication is finished, the second operation for calculating $a*b*R^{\wedge}-1$ mod m is performed. All the values of elements for calculating Equation 4 are defined in Table 1, and thus $a*b*R^{\wedge}-1$ mod m=2708 is obtained using the values.

Figure 5A:
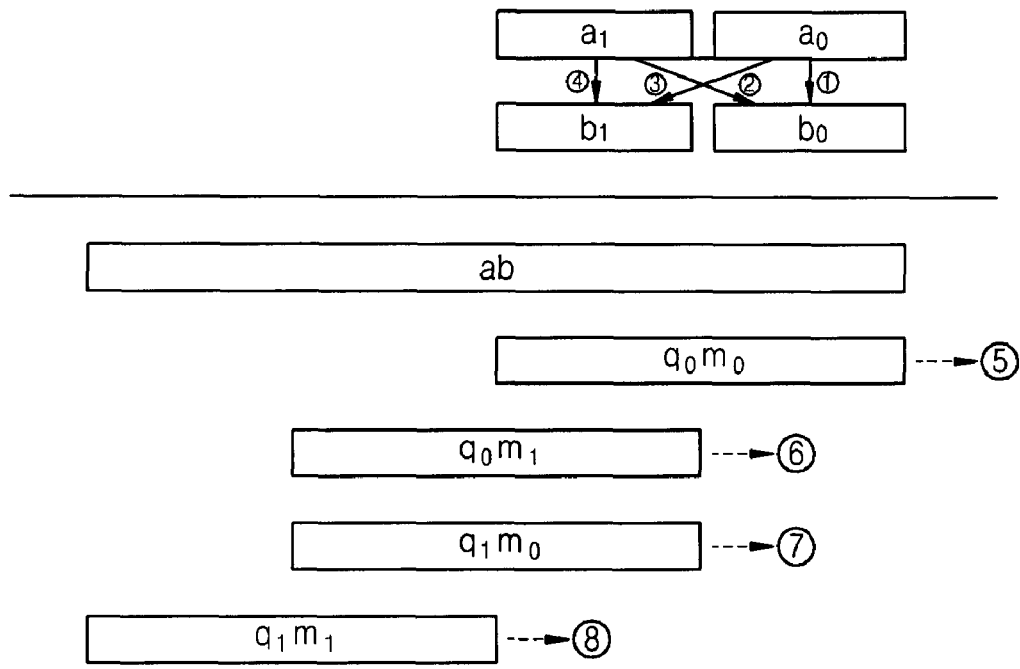
FIG. 5(a) illustrates a modular multiplication method according to a Montgomery multiplication method and FIG. 5(b) a modular multiplication method according to example embodiments in order to compare the number of multiplications required for a Montgomery multiplication method and a number of multiplications required for the modular multiplication method according to example embodiments.
Figure 5B:
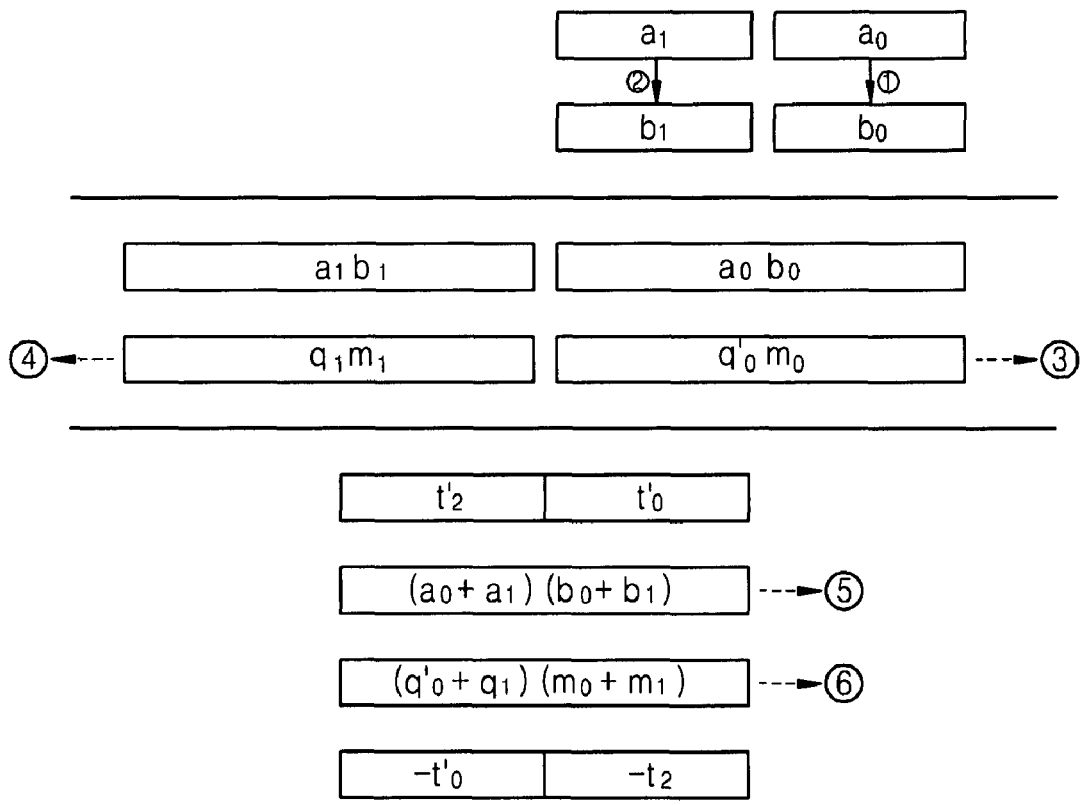

FIG. 5(a) illustrates the Montgomery multiplication method and FIG. 5(b) illustrates the modular multiplication method according to example embodiments in order to compare the number of multiplications required for the Montgomery multiplication method and the number of multiplications required for the modular multiplication method according to example embodiments. As illustrated in FIG. 5(a), the Montgomery multiplication method requires four multiplications for respectively multiplying the upper bits a1 and lower bits a0 of the multiplicand a by the upper bits b1 and the lower bits b0 of the multiplier b. In addition, the Montgomery method further requires four multiplications for respectively multiplying a multiple of the modulus m for the four multiplication results for a total of eight (8) multiplications.

However, the modular multiplication method according to example embodiments may use a multiplication for multiplying the lower bits a0 of the multiplicand a by the lower bits b0 of the multiplier b, a multiplication for multiplying the upper bits a1 of the multiplicand by the upper bits b1 of the multiplier b, and two multiplications for respectively multiplying a multiple of the modulus m for the two multiplications a0*b0 and a1*b1.

In the second operation, the modular multiplication according to example embodiments obtains the modular multiplication result using a method similar to Karatsuba multiplication. The second operation may include only a multiplication for calculating $(a0*11)*(b0*b1)$ and a multiplication for calculating $(q'0+a1)*(m0+m1)$. That is, the modular multiplication method according to example embodiments illustrated in FIG. 5(b) may reduce the number of multiplications to ¾ of the number of multiplications required for the conventional Montgomery method. Accordingly, the modular multiplication processing speed may be improved. Further, example embodiments may perform a left-to-right reduction and a right-to-left reduction in parallel, and thus the modular multiplication processing speed can be further increased.

Figure 6:
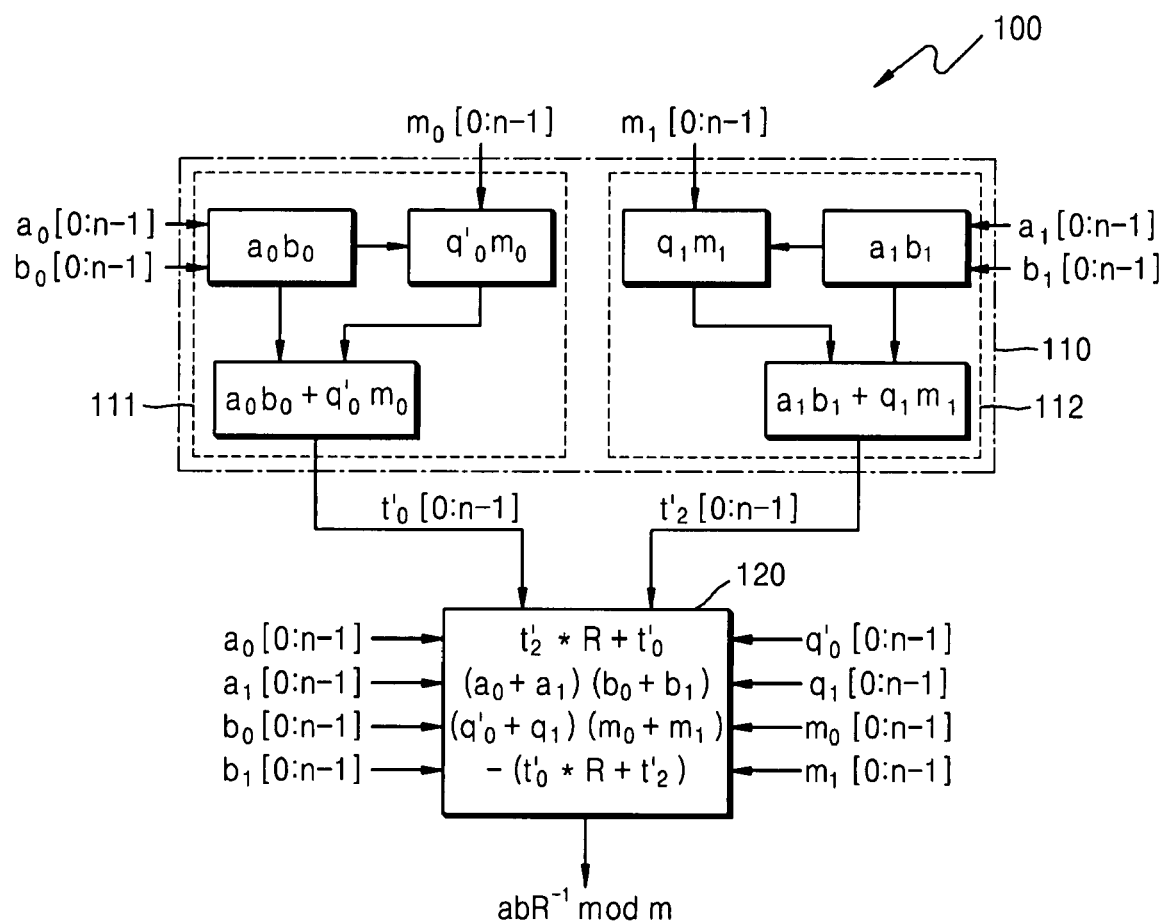
FIG. 6 is a block diagram of a modular multiplier according to example embodiments.

FIG. 6 is a block diagram of a modular multiplier 100 according to example embodiments. A hardware configuration for performing the modular multiplication example embodiments may be designed from arithmetic expressions illustrated in FIG. 6, and thus a detailed explanation thereof will be omitted here. The arithmetic expressions illustrated in FIG. 6 have been explained, and thus detailed explanations thereof will be omitted here.

As illustrated in FIG. 6, the modular multiplier 100 calculates $a*b*R^{-1} \bmod m$ using a multiplicand a, a multiplier b and a modulus m. The multiplicand may be composed of a first bit string $a0[0:n-1]$ and a second bit string $a1[0:n-1]$. In example embodiments, the first bit string $a0[0:n-1]$ is an n-bit lower bit string of the multiplicand a and the second bit string $a1[0:n-1]$ is an n-bit upper bit string of the multiplicand a.

The multiplier b can be composed of a first bit string $b0[0:n-1]$ and a second bit string $b1[0:n-1]$. In example embodiments, the first bit string $b0[0:n-1]$ is an n-bit lower bit string of the multiplier b and the second bit string $b1[0:n-1]$ is an n-bit upper bit string of the multiplier b.

The modulus m may be composed of a first bit string $m0[0:n-1]$ and a second bit string $m1[0:n-1]$. In example embodiments, the first bit string $m0[0:n-1]$ is an n-bit lower bit string of the modulus m and the second bit string $m1[0:n-1]$ is an n-bit upper bit string of the modulus m. In $a*b*R^{-1} \bmod m$, R can be $2^n$.

The modular multiplier 100 may include an arithmetic block 110 for performing the first operation of the modular multiplication method, and the arithmetic block 110 may include a first arithmetic block 111 and a second arithmetic block 112.

The first arithmetic block 111 may receive the first bit string $a0[0:n-1]$ of the multiplicand a, the first bit string $b0[0:n-1]$ of the multiplier b and the first bit string $m0[0:n-1]$ of the modulus m. The first arithmetic block 111 may perform a multiplication on the first bit string $a0[0:n-1]$ of the multiplicand a and the first bit string $b0[0:n-1]$ of the multiplier b. In addition, the first arithmetic block 111 may perform a reduction for eliminating predetermined or defined bits of the multiplication result and outputs the reduction result.

For example, the first arithmetic block 111 may perform a multiplication on the first bit string $a0[0:n-1]$ of the multiplicand a and the first bit string $b0[0:n-1]$ of the multiplier b to produce a 2n-bit multiplication result $a0*b0$. The first arithmetic block 111 may carry out a first reduction for eliminating lower bits (for example, lower n bits) of the multiplication result $a0*b0$.

In the first reduction process, a predetermined or defined first integer q'0 is set based on the multiplication result $a0*b0$, and the first integer q'0 is multiplied by the first bit string $m0[0:n-1]$ of the modulus m ($q'0*m0$). The 2n-bit multiplication result $a0*b0$ is added to $q'0*m0$ ($a0*b0+q'0*m0$), and thus lower n bits of the multiplication result $a0*b0$ are eliminated. Consequently, an n-bit reduction result $t'0[0:n-1]$ is output from the first arithmetic block 111.

The second arithmetic block 112 performs an arithmetic operation in a manner similar to that of the first arithmetic block 111. In example embodiments, the operation of the second arithmetic block 112 is not affected by the operation result of the first arithmetic block 111, and the first and second arithmetic blocks 111 and 112 are independently operated. Furthermore, the arithmetic operations of the first and second arithmetic blocks 111 and 112 are simultaneously performed.

The second arithmetic block 112 multiplies the second bit string $a1[0:n-1]$ of the multiplicand a by the second bit string $b1[0:n-1]$ of the multiplier b to produce an 2n-bit multiplication result $a1*b1$. In addition, the second arithmetic block 112 sets a predetermined or defined second integer q1 based on the multiplication result $a1*b1$ and multiplies the second bit string $m1[0:n-1]$ of the modulus m by the second integer q1 ($q1*m1$). The 2n-bit multiplication result $a1*b1$ is added to $q1*m1$, and thus upper n bits are eliminated from the 2n-bit multiplication result $a1*b1$. Consequently, an n-bit result $t'2[0:n-1]$ is output from the second arithmetic block 112.

The results $t'0[0:n-1]$ and $t'2[0:n-1]$ of the first operation of the modular multiplication are provided to a third arithmetic block 120 for performing the second operation of the modular multiplication. The third arithmetic block 120 calculates an interim value using the outputs of the first and second arithmetic blocks 111 and 112. In example embodiments, the interim value corresponds to $t'2*R+t'0$.

The third arithmetic block 120 performs the actual modular multiplication using the interim value. To achieve this, the third arithmetic block 120 must perform an arithmetic operation corresponding to $a*b*R^{-1} \bmod m = t'2*R+t'0+(a0+a1)(b0+b1)-a0*b0-a1*b1+q'0*m1+q1*m0$.

To reduce the number of multiplications, the third arithmetic block 120 modifies the arithmetic expression $a*b*R^{-1} \bmod m = t'2*R+t'0+(a0+a1)(b0+b1)-a0*b0-a1*b1+q'0*m1+q1*m0$ and performs an arithmetic operation similar to Karatsuba arithmetic. The actual modular multiplication may be effectively performed by performing the arithmetic operation similar to Karatsuba arithmetic by using the interim value.

The third arithmetic block 120 may obtain a modular multiplication result by performing only multiplications $(a0+a1)*(b0+b1)$ and $(q'0+q1)*(m0+m1)$. Specifically, the multiplication results $(a0+a1)*(b0+b1)$ and $(q'0+q1)*(m0+m1)$ are respectively added to the interim value $t'2*R+t'0$. The addition results are added to $-(t'0*R+t'2)$ to calculate $a*b*R^{-1} \bmod m$.

Example embodiments may be implemented, in hardware or software, for example, as any suitable computer program. For example, a program in accordance with one or more example embodiments may be a computer program product causing a computer to execute one or more of the example methods described herein.

The computer program product may include a computer-readable medium having computer program logic or code portions embodied thereon for enabling a processor of to perform one or more functions in accordance with one or more example methodology described above. The computer program logic may thus cause the processor to perform one or more of the example methodologies, or one or more functions of a given methodology described herein.

The computer-readable storage medium may be a built-in medium inside a computer main body or removable medium arranged so that it may be separated from a computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed for simulating arbitrary software and/or unmodified code directly on a host processor, in accordance with example embodiments.

Further, such programs, when recorded on computer-readable storage media, may be readily stored and distributed. The storage medium, as it is read by a computer, may enable the simulation of arbitrary software and/or unmodified code directly on a host processor, in accordance with the example embodiments.

Example embodiments being thus described, it will be obvious that the same may be varied in many ways. For example, the methods according to example embodiments may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s).

While example embodiments have been particularly shown and described with reference to FIGS. 1-6, it will be understood by those of ordinary skill in the art that various changes in form and details may be made therein without departing from the spirit and scope of example embodiments as defined by the following claims.

What is claimed is:

1. A modular multiplication method comprising:
performing, using a first arithmetic calculation circuit, a first arithmetic operation including a first multiplication on lower n bits of a multiplicand and lower n bits of a multiplier and a first reduction for eliminating partial bits of the first multiplication result;
performing, using a second arithmetic calculation circuit, a second arithmetic operation including a second multiplication on upper n bits of the multiplicand and upper n bits of the multiplier and a second reduction for eliminating partial bits of the second multiplication result; and
calculating, using a third arithmetic calculation circuit, a modular multiplication result using the result of the first arithmetic operation and the result of the second arithmetic result,
wherein the first arithmetic operation and the second arithmetic operation are independently performed.

2. The modular multiplication method of claim 1, wherein the first arithmetic operation and the second arithmetic operation are simultaneously performed.

3. The modular multiplication method of claim 1, wherein the first reduction comprises adding a first multiple of bits of a modulus to the first multiplication result, and the second reduction comprises adding a second multiple of other bits of the modulus to the second multiplication result.

4. The modular multiplication method of claim 1, wherein the first reduction adds a first multiple of a first bit string of the modulus to the first multiplication result to eliminate lower bits of the first multiplication result, and the second reduction adds a second multiple of a second bit string of the modulus to the second multiplication result to eliminate upper bits of the second multiplication result.

5. The modular multiplication method of claim 4, wherein the modulus includes the first bit string corresponding to lower n bits and the second bit string corresponding to upper n bits.

6. The modular multiplication method of claim 4, wherein the first arithmetic operation eliminates lower n bits from the first multiplication result having 2n bits and provides upper n bits of the first multiplication result as a first arithmetic operation result, and the second arithmetic operation eliminates upper n bits from the second multiplication result having 2n bits and provides lower n bits of the second multiplication result as a second arithmetic operation result.

7. The modular multiplication method of claim 6, wherein calculating the modular multiplication calculates $a*b*R^{-1}$ mod m ($R=2^n$, m is a modulus) to obtain the modular multiplication result and includes an operation for calculating $t'2*R+t'0$ ($t'0$ corresponds to the first arithmetic operation result having n bits and $t'2$ corresponds to the second arithmetic operation result having n bits) as an interim value.

8. The modular multiplication method of claim 7, wherein calculating the modular multiplication adds a first value obtained by multiplying the lower n bits of the multiplicand by the upper n bits of the multiplier, a second value obtained by multiplying the upper n bits of the multiplicand by the lower n bits of the multiplier, a third value corresponding to a second multiple of the first bit string of the modulus and a fourth value corresponding to a first multiple of the second bit string of the modulus to the interim value.

9. The modular multiplication method of claim 8, wherein calculating the modular multiplication performs a multiplication for calculating $(a0+a1)*(b0+b1)$ and a multiplication for calculating $(q'0+q1)*(m0+m1)$ (a0 represents the lower n bits of the multiplicand, a1 represents the upper n bits of the multiplicand, b0 denotes the lower n bits of the multiplier, b1 denotes the upper n bits of the multiplier, q'0 represents the first multiple, q1 represents the second multiple, m0 denotes the first bit string of the modulus, and m1 denotes the second bit string of the modulus), and
calculates $a*b*R-1 \bmod m = (a0+a1)(b0+b1)+(q'0+q1)(m0+m1)+t'0-t'0*R-t'2+t'2*R$ to obtain the modular multiplication result.

10. A modular multiplication method comprising:
performing, using a multiplier circuit, a multiplication on a multiplicand (a) and a multiplier (b), the multiplication including a first multiplication on lower n bits of a multiplicand (a) and lower n bits of a multiplier (b), and a second multiplication on an upper n bits of the multiplicand (a) and an upper n bits of the multiplier (b);
performing, using a first arithmetic calculation circuit, a first reduction for eliminating lower bits of a result of the first multiplication and a second reduction, using a second arithmetic calculation circuit, for eliminating upper bits of a result of the second multiplication; and obtaining, using a third arithmetic calculation circuit, a modular multiplication result using the first reduction result and the second reduction result,
wherein the first reduction and the second reduction are independently performed.

11. The modular multiplication method of claim 10, wherein the first reduction and the second reduction are simultaneously performed.

12. The modular multiplication method of claim 10, wherein
the multiplicand is 2n-bit data including a first bit string corresponding to the lower n bits and a second bit string corresponding to the upper n bits,
the multiplier is 2n-bit data including a first bit string corresponding to the lower n bits and a second bit string corresponding to the upper n bits, and
a modulus (m) is 2n-bit data including a first bit string corresponding to lower n bits and a second bit string corresponding to upper n bits, the modular multiplication method calculating $a*b*R^{-1}$ mod $m(R=2^n)$.

13. The modular multiplication method of claim 10, wherein the first reduction comprises adding a first multiple of the first bit string of the modulus to the result of the first multiplication, and the second reduction comprises adding a second multiple of the second bit string of the modulus to the result of the second multiplication.

14. The modular multiplication method of claim 13, wherein
the first reduction eliminates lower n bits from the first multiplication result having 2n bits and provides upper n bits which are not eliminated as a first reduction result, and
the second reduction eliminates upper n bits from the second multiplication result having 2n bits and provides lower n bits which are not eliminated as a second reduction result.

15. The modular multiplication method of claim 14, wherein the obtaining of the modular multiplication result comprises:
performing a multiplication for calculating $(a0+a1)*(b0+b1)$ and a multiplication for calculating $(q'0+q1)*(m0+m1)$ (a0 represents the first bit string of the multiplicand, a1 represents the second bit string of the multiplicand, b0 denotes the first bit string of the multiplier, b1 denotes the second bit string of the multiplier, q'0 represents the first multiple, q1 represents the second multiple, m0 denotes the first bit string of the modulus, and m1 denotes the second bit string of the modulus), and
calculating $a*b*R^{-1}$ mod $m=(a0+a1)(b0+b1)+(q'0+q1)(m0+m1)+t'0-t'0*R-t'2+t'2*R$ to obtain the modular multiplication result.

16. A modular multiplier comprising:
a first arithmetic block performing a first multiplication on a lower bit string of a multiplicand and a lower bit string of a multiplier and carrying out a first reduction for eliminating partial bits of the first multiplication result;
a second arithmetic block performing a second multiplication on a upper bit string of the multiplicand and a upper bit string of the multiplier and carrying out a second reduction for eliminating partial bits of the second multiplication result; and
a third arithmetic block obtaining a modular multiplication result using outputs of the first arithmetic block and the second arithmetic block.

17. The modular multiplier of claim 16, wherein the arithmetic operation of the first arithmetic block and the arithmetic operation of the second arithmetic block are independently performed.

18. The modular multiplier of claim 16, wherein the first arithmetic block comprises:
a first arithmetic unit performing the first multiplication on the lower bit string of the multiplicand and the lower bit string of the multiplier;
a second arithmetic unit setting a first integer and multiplying a first bit string of a modulus by the first integer; and
a third arithmetic unit receiving the arithmetic results of the first arithmetic unit and the second arithmetic unit and performing a first reduction for eliminating partial lower bits of the first multiplication result.

19. The modular multiplier of claim 18, wherein the second arithmetic block comprises:
a fourth arithmetic unit performing the second multiplication on the upper bit string of the multiplicand and the upper bit string of the multiplier;
a fifth arithmetic unit setting a second integer and multiplying a second bit string of the modulus by the second integer; and
a sixth arithmetic unit receiving the arithmetic results of the fourth arithmetic unit and the fifth arithmetic unit and performing a second reduction for eliminating partial upper bits of the second multiplication result.

20. The modular multiplier of claim 19, wherein
the multiplicand is 2n-bit data including a first bit string corresponding to lower n bits and a second bit string corresponding to upper n bits,
the multiplier is 2n-bit data including a first bit string corresponding to lower n bits and a second bit string corresponding to upper n bits,
the modulus is 2n-bit data including the first bit string corresponding to lower n bits and the second bit string corresponding to upper n bits, and
the third arithmetic block calculates $a*b*R^{-1}$ mod m $(R=2^n)$ to obtain the modular multiplication result.

21. The modular multiplier of claim 20, wherein lower n bits of the first multiplication result having 2n bits are eliminated and a value of upper n bits which are not eliminated, t'0, is output from the third arithmetic unit according to the first reduction, and upper n bits of the second multiplication result having 2n bits are eliminated and a value of lower n bits which are not eliminated, t'2, is output from the sixth arithmetic unit according to the second reduction.

22. The modular multiplier of claim 21, wherein the third arithmetic block performs a multiplication for calculating $(a0+a1)*(b0+b1)$ and a multiplication for calculating $(q'0+q1)*(m0+m1)$ (a0 represents the first bit string of the multiplicand, a1 represents the second bit string of the multiplicand, b0 denotes the first bit string of the multiplier, b1 denotes the second bit string of the multiplier, q'0 represents the first multiple, q1 represents the second multiple, m0 denotes the first bit string of the modulus, and m1 denotes the second bit string of the modulus), and
calculates $a*b*R^{-1}$ mod $m=(a0+a1)(b0+b1)+(q'0+q1)(m0+m1)+t'0-t'0*R-t'2+t'2*R$ to obtain the modular multiplication result.

23. A cryptosystem including the modular multiplier of claim 16.

* * * * *